United States Patent [19]

Iyer

[11] Patent Number: 5,528,762
[45] Date of Patent: Jun. 18, 1996

[54] SELF-TIMED DATA STREAMING RECEIVER AND TRANSMITTER HAVING REDUCED LATENCY AND INCREASED DATA STREAMING CAPABILITY

[75] Inventor: Venkatraman Iyer, Portland, Oreg.

[73] Assignee: Intel Corporation, Santa Clara, Calif.

[21] Appl. No.: 173,970

[22] Filed: Dec. 27, 1993

[51] Int. Cl.$^6$ ............................................ G06F 13/14
[52] U.S. Cl. ............. 395/200.15; 395/800; 364/DIG. 1; 364/229.5; 364/239
[58] Field of Search .............................. 395/200, 800, 395/575, 200.15; 370/60, 85

[56] References Cited

U.S. PATENT DOCUMENTS

| | | | |
|---|---|---|---|
| 4,922,486 | 5/1990 | Lidinsky et al. | 370/60 |
| 4,933,933 | 6/1990 | Dally et al. | 370/60 |
| 5,008,882 | 4/1991 | Peterson et al. | 370/94.3 |
| 5,038,386 | 8/1991 | Li | 382/49 |
| 5,058,001 | 10/1991 | Li | 364/200 |
| 5,101,480 | 3/1992 | Shin et al. | 395/325 |
| 5,105,424 | 4/1992 | Flaig et al. | 370/94 |
| 5,138,615 | 8/1992 | Lamport et al. | 370/94.3 |
| 5,181,017 | 1/1993 | Frey, Jr. et al. | 395/200 |
| 5,204,949 | 4/1993 | Yasue et al. | 395/200 |
| 5,243,596 | 9/1993 | Port et al. | 370/94.1 |
| 5,333,268 | 7/1994 | Douglas et al. | 395/200 |
| 5,333,279 | 7/1994 | Dunning | 395/325 |

*Primary Examiner*—Mehmet Geckil
*Attorney, Agent, or Firm*—Blakely, Sokoloff, Taylor & Zafman

[57] ABSTRACT

A self-timed data streaming receiver for a routing chip. Incoming flits are received by a distributor that distributes the flits between two self-timing FIFOs. A collector coupled to both FIFOs at their opposite ends takes the two streams of flits and recreates the original stream of flits prior to coupling the flits to routing control circuitry. A self-timed data streaming transmitter is also described.

40 Claims, 10 Drawing Sheets

SELF-TIMED DATA STREAMING RECEIVER AND TRANSMITTER HAVING REDUCED LATENCY AND INCREASED DATA STREAMING CAPABILITY

RELATED PATENT

This application is related to U.S. Pat. No. 5,333,279, issued on Jul. 26th, 1994, entitled "Self-Timed Mesh Routing Chip With Data Broadcasting," assigned to the same assignee of Intel Incorporated, Santa Clara, Calif.

FIELD OF THE INVENTION

The present invention relates to routing circuitry in a massively parallel supercomputer. In particular, the present invention relates to a data streaming, self-timing transceiver for a routing chip.

BACKGROUND OF THE INVENTION

Massively parallel computers use many microprocessors operating in parallel. The microprocessors are connected together by a mesh of routing chips. Routing chips route data in the form of flow control units, called flits, which typically include 16 data bits and two parity bits. Each routing chip transmits and receives flits from adjacent routing chips, as well as transmitting and receiving flits from the microprocessor with which the routing chip is associated.

The mesh operates without a master clock, using a self-timing, two cycle signaling protocol. A routing chip signals transmission of a flit to one of its neighbors by toggling a request signal, REQ. After the neighboring routing chip loads the flit, it acknowledges receipt of the flit by toggling an acknowledge signal, ACK.

Interlock signaling refers to a two cycle signaling protocol that requires acknowledgment of a transmit request prior to transmission of another flit. Interlock signaling works well when distances between the source and destination of a flit are small. As the distances between the source and destination increase, due to increased mesh size, the rate of flit transmission decreases.

Data streaming can increase the flit transmission rate and prevent interlock by permitting a number of consecutive flits to be transmitted without acknowledgment provided that the streaming depth is matched to the distance between the source and destination. Increased distance between source and destination routing chips requires increased streaming depth to avoid interlock. If the streaming depth of routing chips is not matched to the distance between source and destination then data streaming will defer but not prevent interlock and decreased flit transmission rate. Routing chips using data streaming begin operating in interlock when the maximum number of flits that can be consecutively transmitted without acknowledgment have been transmitted.

The Paragon™ Supercomputer manufactured by Intel Corporation of Santa Clara, Calif., uses a prior mesh routing chip that allows up to four flits to be transmitted prior to requiring receipt of an acknowledgment. FIG. 1 illustrates a portion of that prior mesh routing chip (MRC). The MRC includes routing control circuitry, a receiver and a transmitter. The transmitter uses a self-timed fall-through, First-In, First-Out register (FIFO) to keep track of whether the number of unacknowledged transmit requests exceeds a maximum number. Similarly, the receiver includes another self-timed fall-through FIFO, which stores flits received by the routing chip. Acknowledgment of a flit occurs after a flit reaches the last stage of the second FIFO.

Both FIFOs include four serially coupled, self-timing tracking units, which use a four cycle signaling protocol. Additionally, the receiver FIFO includes a latch coupled to each tracking unit to store flits as they are received. Each tracking unit indicates that it contains valid data to its downstream neighbor via an active full signal, FULL. The downstream tracking unit indicates that it has begun loading the data by bringing a load signal active and indicates completion of the loading by bringing the load signal inactive. In response, the transmitting upstream tracking unit brings its full signal inactive. The relationship between the full signal and the load signal is illustrated in FIG. 2.

Data streaming increases the latency of the mesh routing chip by increasing the time required to process received flits, acknowledge received flits and process acknowledgments of transmitted flits.

SUMMARY OF THE INVENTION

An object of the present invention is to provide a self-timed data streaming receiver with increased storage capacity and reduced latency.

Another object of the present invention is to provide a self-timed data streaming transmitter that can track a larger number of unacknowledged transmit requests and provide decreased latency time in responding to acknowledgments.

A still further object of the present invention is to provide a self-timed data streaming transceiver that avoids interlock in situations that would cause interlock in prior self-timed data streaming transceivers of equal streaming depth.

A self-timed, data streaming receiver for a routing chip is described. Incoming flits are received by a distributor, which distributes flits between two self-timing, First In First Out registers (FIFOs). A collector coupled to both FIFOs at their opposite ends takes the two streams of flits and recreates the original stream of flits prior to coupling the flits to routing control circuitry.

Also described is a self-timed data streaming transmitter, which permits the routing chip to transmit a number of consecutive flits without acknowledgment. A distributor responds to each transmit request by loading one of two FIFOs. Located at the opposite FIFO ends, a collector clears a bit out of one of the FIFOs whenever the collector receives an acknowledgment. Thus, the transmitter is able to transmit another unacknowledged flit.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which.

DETAILED DESCRIPTION

Figure 1:
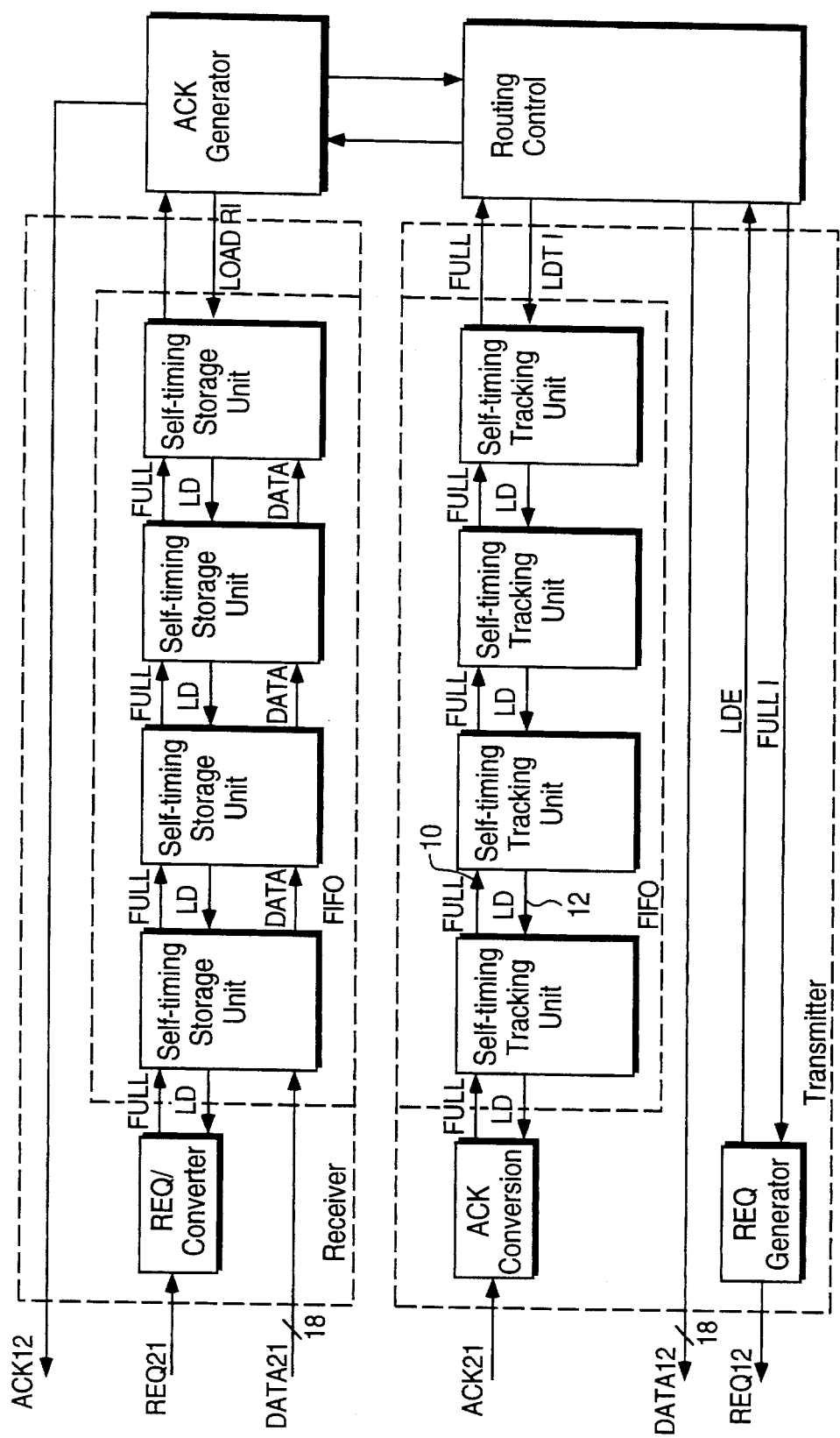
FIG. 1 is a block diagram of a prior self-timed, data streaming transceiver.
Figure 2:
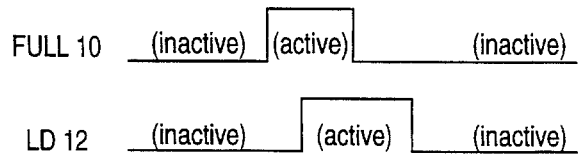
FIG. 2 is a timing diagram of the signals of a four cycle signaling protocol.
Figure 3:
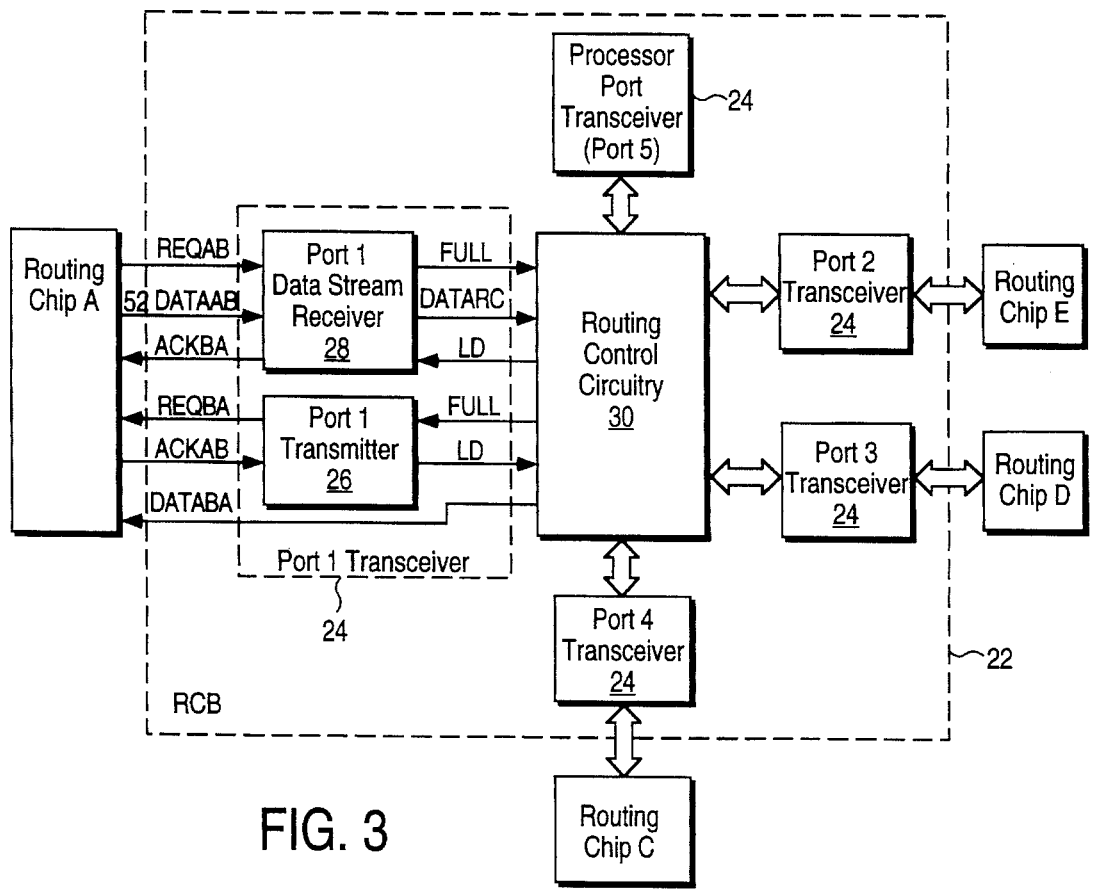
FIG. 3 is a block diagram of a portion of a mesh of a supercomputer.

FIG. 3 illustrates in block diagram form a portion of a mesh in a massively parallel computer. The portion shown includes five routing chips, A, B, C and D, each of which is paired with a microprocessor. Each routing chip includes five ports even though all five ports are illustrated only for routing chip B 22. The five ports allow each routing chip to communicate with its associated microprocessor and its four neighboring routing chips.

As will be described in detail below, each port includes a transceiver 24, even though only the transceiver for port 1 of routing chip B 22 is illustrated. Each transceiver 24 includes a transmitter 26 and a receiver 28 dedicated to communicating with either the routing chip's associated microprocessor or one of the four neighboring routing chips. Briefly described, receiver 28 divides the data streaming of flits between two self-timing, fall-through FIFOs. A distributor alternately distributes flits to the two FIFOs. A collector multiplexes both FIFO outputs to produce a single stream of flits for input to the routing control circuitry. Transmitter 26 also uses two self-timed, fall-through FIFOs to track the number of flits transmitted without acknowledgment. A distributor alternately distributes transmit requests to the two FIFOs. Representations of the unacknowledged transmit requests from both FIFOs reach a collector, where the representations are cleared by the collector in response to acknowledgments. The clearing of representations ripples through the FIFOs, allowing the distributor to indicate to routing control circuitry 30 that another flit may be transmitted.

Figure 4:
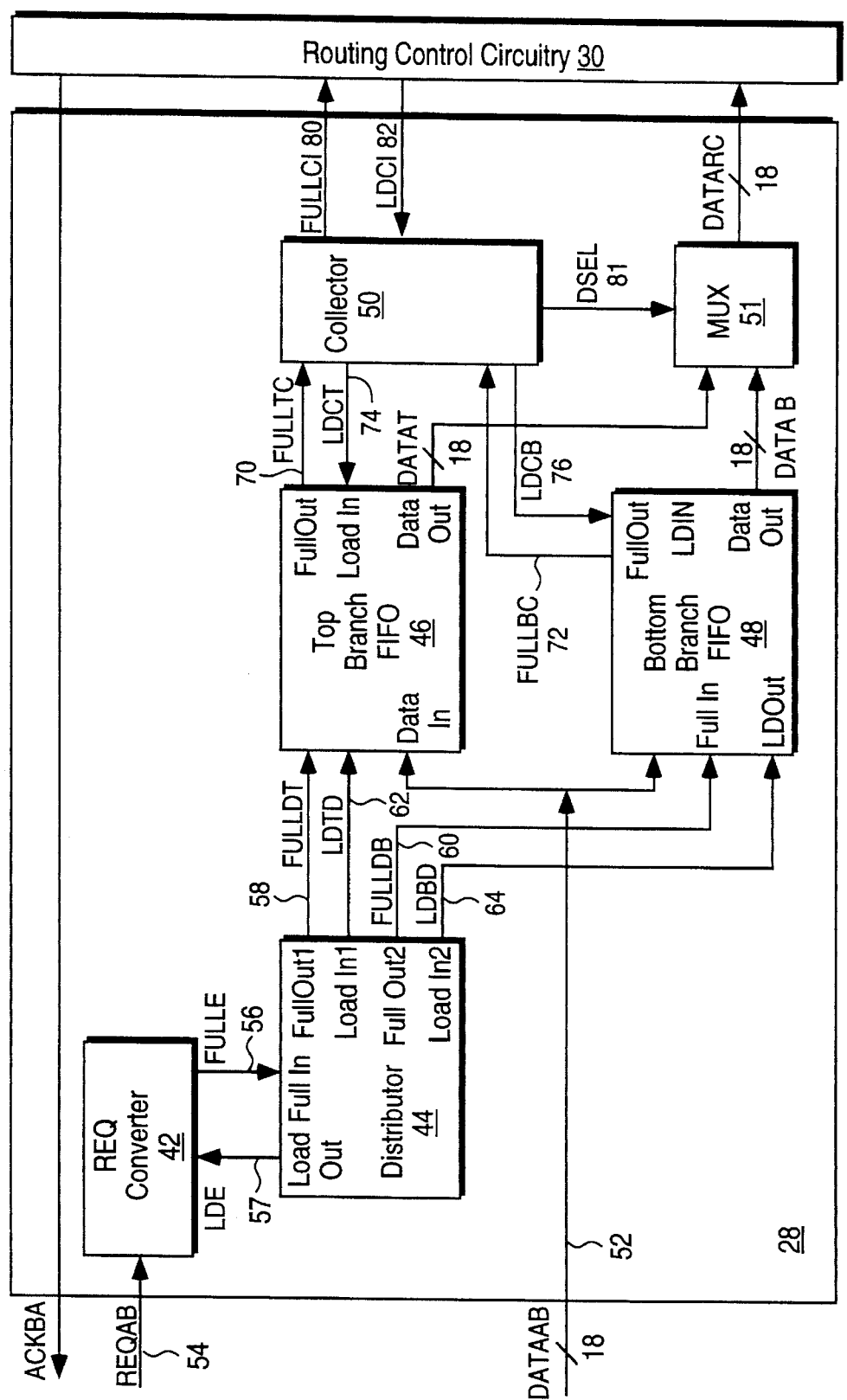
FIG. 4 is a block diagram of a self-timed, data streaming receiver.

FIG. 4 illustrates receiver 28 of port 1, which receives flits transmitted from routing chip A to routing chip B 22. As compared to prior self-timing, data streaming receivers, receiver 28 provides increased data streaming capability with reduced latency times. Receiver 28 includes a REQ converter 42, distributor 44, two fall-through, self-timing FIFOs 46 and 48 and collector 50. Distributor 44, FIFOs 46 and 48 and collector 50 all use four cycle signaling. In other words, devices 44, 46, 48 and 50 each include at least one full input, one full output, one load input and one load output, which serve the purposes described in the Background.

Routing chip A indicates that it is driving valid flit data to routing chip B on lines DATAAB 52 by toggling its transmit request line, REQAB 54. Converter 42 converts the two cycle transmit request REQAB 54 into a four cycle signal. In particular, converter 42 brings FULLE signal 56 active. Converter 42 holds FULLE 56 active until distributor 44 indicates that it has loaded the flit on lines 52.

Provided that both FIFOs 46 and 48 are not full, distributor 44 responds to active FULLE 56 by enabling one of FIFOs 46 and 48 to load the flit represented by DATAAB 52. Distributor 44 alternately enables FIFOs 46 and 48 so that flit storage "ping-pongs" between them. Distributor 44 enables the top branch FIFO 46 to load the flit received by bringing active FULLDT signal 58. Distributor 44 enables the bottom branch FIFO 48 to load the flit received by bringing active FULLDB signal 60. Distributor 44 holds active whichever full signal it asserted until the enabled FIFO 46 or 48 indicates that it has loaded the flit, via either LDTD 62 or LDBD 64. Distributor 44 indicates to converter 42 when the enabled FIFO has loaded the flit via its output signal LDE 57.

Figure 5:
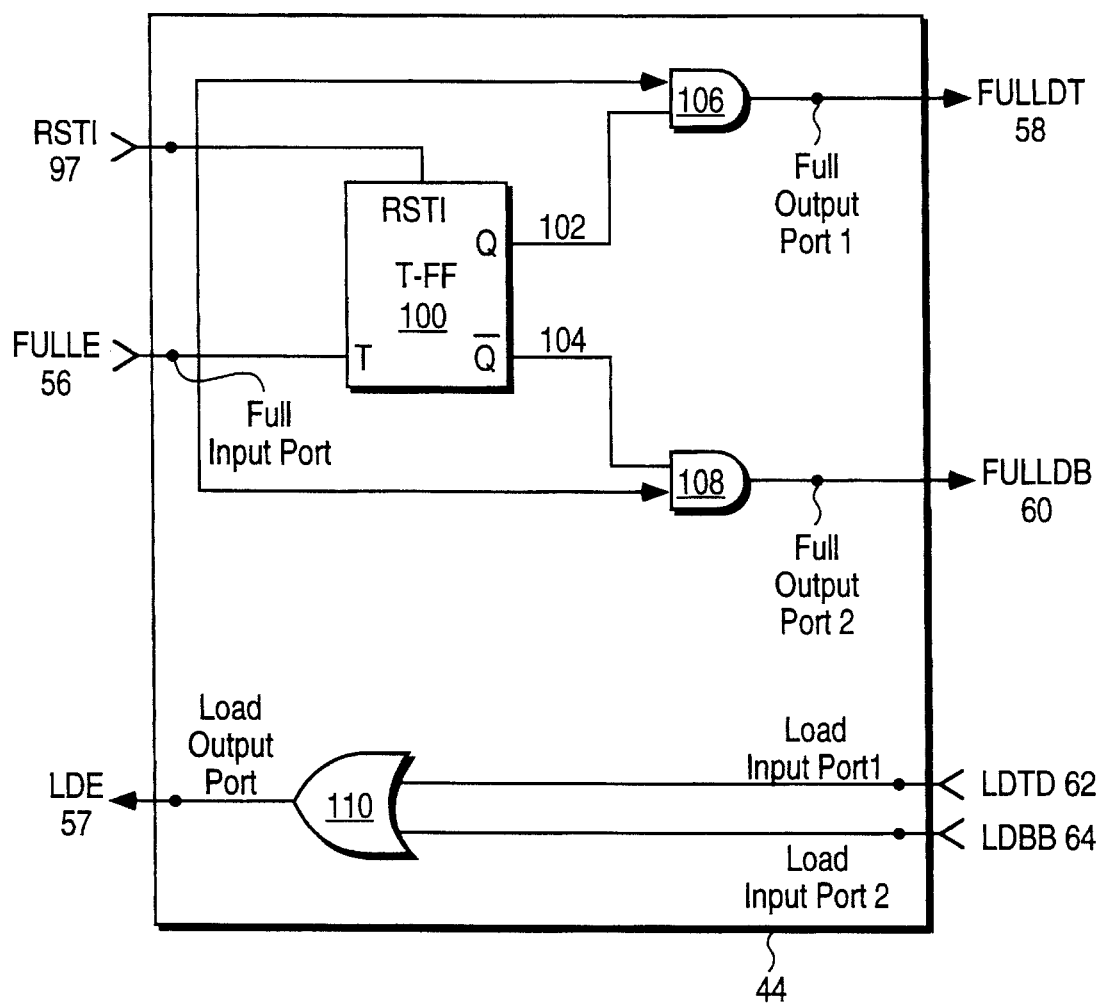
FIG. 5 is a schematic diagram of a distributor.

FIG. 5 illustrates an embodiment of distributor 44 schematically. Distributor 44 generates its two full output signals 58 using toggle flip-flop 100 and AND gates 106 and 108. When routing chip B 22 is powered up, reset signal RSTI 97 goes active low and resets T flip-flop 100. This forces Q output 102 low and its complement 104 high. As long as FULLE 56 is inactive low, the outputs of AND gates 106 and 108 are both low and neither FIFO 46 or 48 is enabled to load a flit. The first time FULLE 56 goes active high, FULLDB 60 goes high enabling bottom branch FIFO 48. When FULLE 56 goes low, FULLDB 60 goes inactive and T-flip-flop 100 toggles its outputs. As a result, the next time FULLE 56 goes high, FULLDT 58 goes active high and enables top branch FIFO 46. Thus, distributor 44 alternately enables top branch FIFO 46 and bottom branch FIFO 48 to load received flits. In alternate embodiments of distributor 44, the demultiplexing function of T-flip-flop 100 is done by using REQAB 54 as a select to generate FULLDT 58 and FULLDB 60.

In the embodiment of FIG. 5, distributor 44 generates its load output signal, LDE 57, using OR gate 110. OR gate 110 receives load input signals 62 and 64 from FIFOs 46 and 48. Only one signal 62 or 64 will be active at a time because only one FIFO 46 or 48 is enabled to load a flit at a time. Thus, whenever one of signals 62 or 64 goes active high, LDE 57 goes active high. LDE 57 will not signal that it has completed loading the flit until one of FIFOs 46 or 48 signals that it has completed loading the flit. In alternate embodiments of distributor 44, OR gate 110 is replaced by a combination of NAND gates and inverters.

Given this understanding of distributor 44, consider again receiver 28 of FIG. 3. As stated, distributor 44 controls the distribution of flits into FIFOs 46 and 48. Top Branch FIFO 46 and bottom branch FIFO 48 operate identically and in parallel, both passing flits through a series of storage devices until they reach the FIFO output. The streaming depth of receiver 28 is equal to the sum of the streaming depths of FIFOs 46 and 48, but the maximum latency of receiver 28 is not the sum of the time required for a flit to fall-through both FIFOs 46 and 48. The maximum latency of receiver 28 is the time required for a flit to fall through the FIFO 46 or 48 with the greatest storage capacity. This is because every flit passes through only one FIFO 46 or 48. For embodiments in which FIFOs 46 and 48 have the same streaming depth, the latency of receiver 28 is half what would be experienced in a prior data streaming receiver having the same streaming depth.

The streaming depth of receiver 28 can be further increased with little or no increase in receiver latency by adding additional FIFOs in parallel with FIFOs 46 and 48. The increase in streaming depth is the total additional storage capacity of the additional FIFOs. Whether or not there would be any increase in latency depends upon whether the storage capacity of any of the additional FIFOs exceeds that of either FIFO 46 or 48.

Preferably, FIFOs 46 and 48 have the same flit storage capacity. In one embodiment, both FIFOs 46 and 48 have a streaming depth of 8 flits, which gives receiver 28 a streaming depth of 16 flits. Alternate embodiments of receiver 28 in which FIFOs 46 and 48 have differing storage capacities will function equally well.

Figure 6:
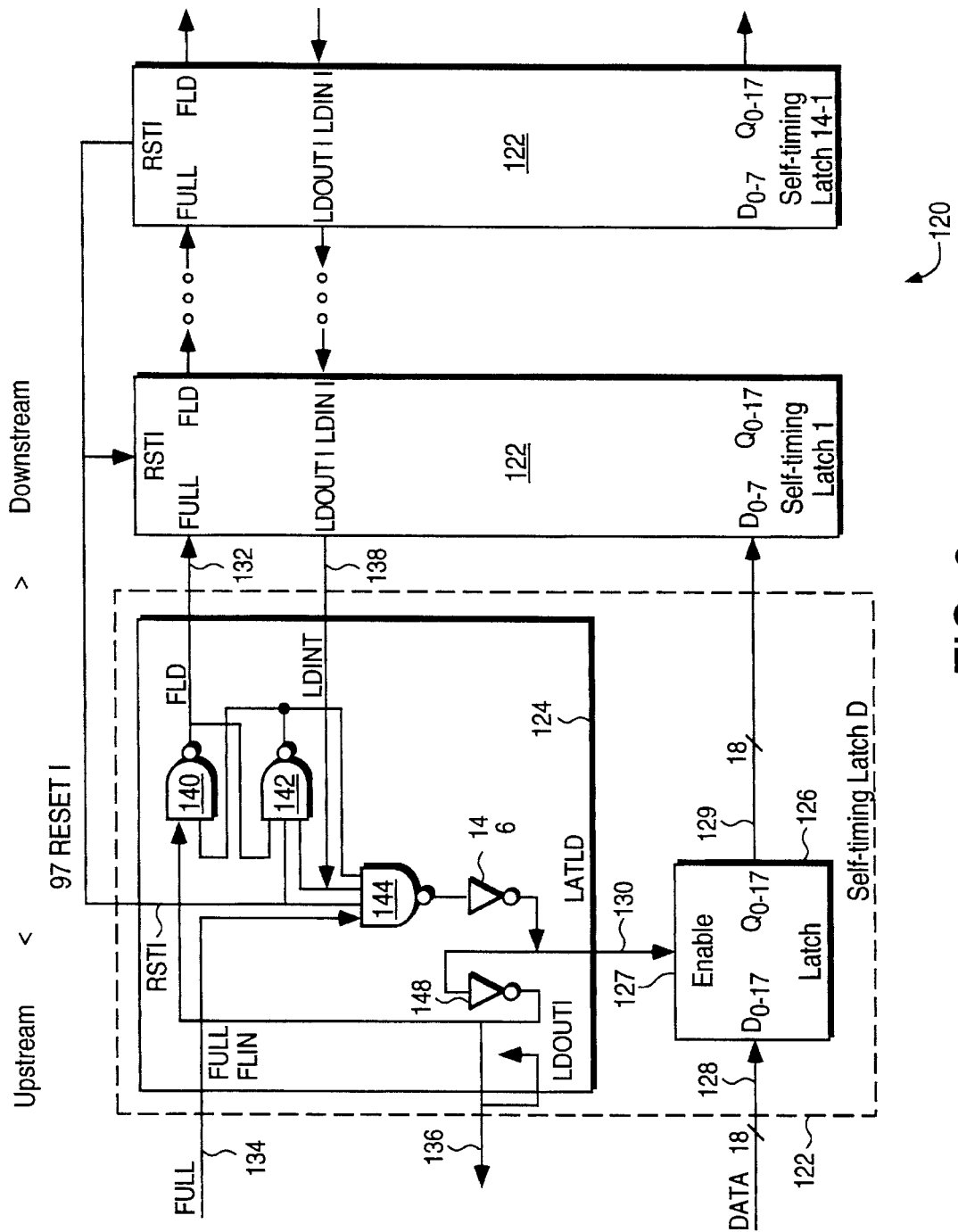
FIG. 6 is a block diagram of a self-timed FIFO.

FIG. 6 illustrates in block diagram form the general form of a FIFO 120, upon which both FIFOs 46 and 48 are preferably based. FIFO 120 includes a number of serially coupled, self-timing storage units 122, also called self-timing latches 122. The streaming depth of FIFO 120 depends upon the number of storage latches 122 used. Data is input into FIFO 120 by distributor 44 at the far left of FIG. 6 and is output at the far right to collector 50. Stated another way, flits are input upstream and flow downstream.

Each self-timing latch 122 includes a control unit 124 and a D-type latch 126, even though they are illustrated for only one latch 122. D-type latch 126 stores a flit of data, thus the width of latch 126 depends upon the number of bits included in a flit. The loading of D-type latch 126 is controlled by its enable input 127. When enabled, latch 126 latches the data applied to inputs 128 and couples them to outputs 129.

Control unit 124 controls the enabling of its associated D-type latch 126 via latch load signal LATLD 130. Control unit 124 determines when to enable latch 126 based upon whether latch 126 stores a valid flit that has not been loaded yet and upon whether there is valid upstream data. Control unit 124 determines whether the data stored in latch 126 has been loaded by the immediately adjacent downstream latch 122 based upon the state of its full output signal, FLO 132, and the state of LDINI 138 from its downstream neighbor. Control unit 124 determines whether there is valid data applied to latch 126 based upon its full input signal, FULL 134.

Control unit 124 includes three NAND gates 140, 142 and 144, as well as inverters 146 and 148. Control unit 124 is reset when routing chip 22 is powered up by RESETI 97, which is active low. RESETI 97 is coupled to an input of NAND gate 144, as a result, active RESETI 97 forces high the output of NAND gate 144. LATLD 130 is an inverted version of the output from NAND gate 144. Thus, active RESETI 97 brings LATLD 130 low. Inverter 148 inverts LATLD 130 and provides its output, LDOUTI 136, to the input of NAND gate 140. As a result, active RESETI 97 applies one high input signal to NAND gate 140. Active RESETI 97 also applies another high input signal to NAND gate 140 to bring its output inactive low in response to power-up. The second signal applied as an input to NAND gate 140 is the output of NAND gate 142. The output of NAND gate 142 is forced high upon power-up because RESETI 97 is an input.

Figure 7:
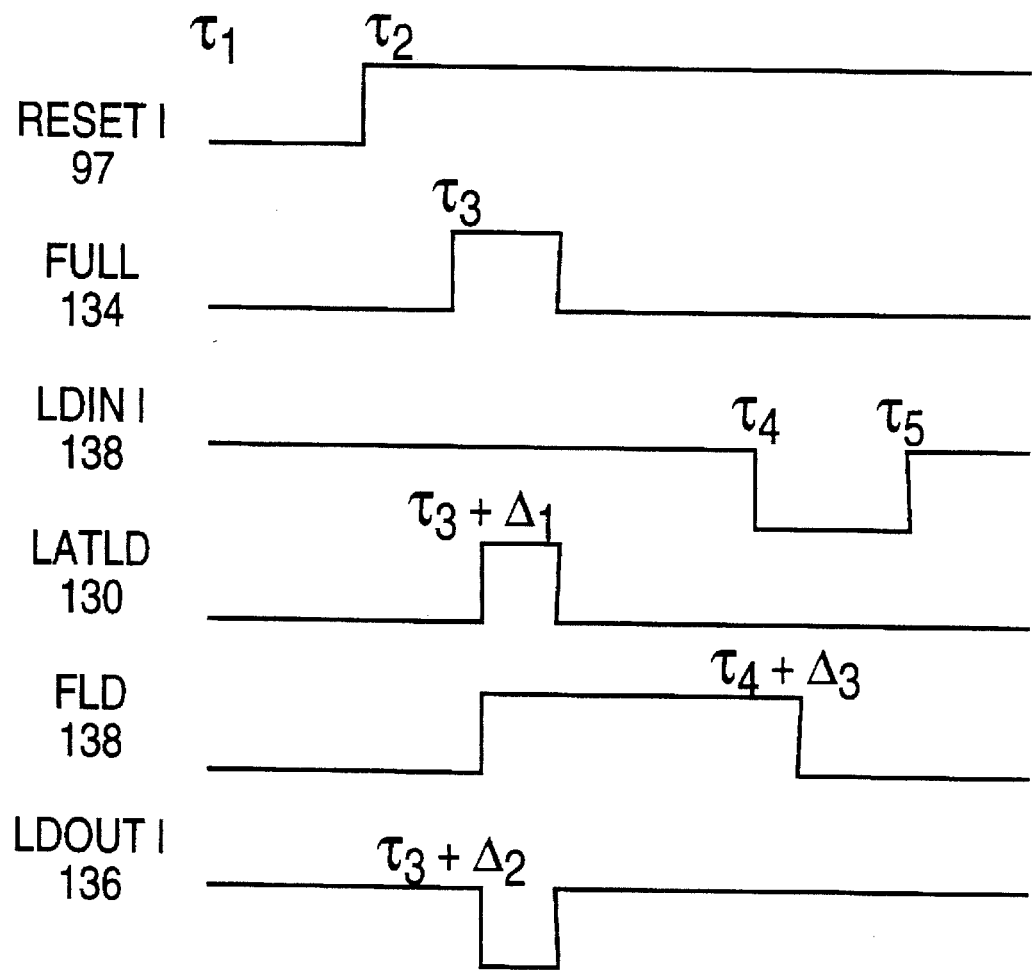
FIG. 7 is a timing diagram of input and output signals of a control unit within a storage unit.

We know that active RESETI 97 forces LDINI 138 inactive high because it is the load output from an identical downstream control unit 124. We also know that active RESETI 97 forces input signal FULL 134 inactive low because it is generated either by distributor 44 or an identical upstream control unit 124. FIG. 7 illustrates the state of all inputs and outputs to control unit 124 in response to RESETI 97 going active low at time $t_1$.

At time $t_2$ RESETI 97 returns inactive high. While this changes the state of an input into both NAND gates 142 and 144, neither gate changes its output. The output of NAND gate 142 remains high because one of its inputs is coupled to FLO 132, which active RESETI 97 forced low and which remains low. The output of NAND gate 144 remains high at time $t_2$ because one of its inputs is coupled to FULL 134, which active RESETI 97 also forced low and which remains low. NAND gates 140 and 142 implement a latch whose state is maintained until their inputs change in a specific manner.

At time $t_3$ latch 122's upstream neighbor signals that it stores valid data by bringing FULL 134 active high. NAND gate 144 responds to the change in FULL 134 by forcing its output low. As a result, inverter 146 drives LATLD 130 active high and latch 126 begins to latch the data applied to its inputs 128. A short time afterward, inverter 148 responds by driving LDOUTI 136 active low. This indicates to the upstream neighbor that latch 122 has begun loading the flit and makes FULL 134 inactive. Shortly after LDOUTI 136 goes low, NAND gate 140 responds by driving its output, FLO 132, active high. Thus, control unit 124 informs its downstream neighboring latch 122 that valid data is being applied to its inputs. FLO 132 going high also causes output of NAND gate 142 to go low, changing the state of the NAND gate latch formed by gates 140 and 142 to a state opposite to that after RESET. The loading pulse of LATLD 130 ends when the output of NAND 142 goes low. This decouples the data inputs 128 from outputs 129. This also releases the upstream neighbors control unit 124 to load its data unit 126 with a new flit.

At some time $t_4$, LDINI 138 goes active indicating that the downstream latch 122 has begun to latch the data coupled to it by its upstream neighbor. This causes the NAND gate latch formed by gate 140 and 142 to change its state. In response, FLO 132 goes inactive.

Eventually at $t_5$ LDINI 138 goes inactive and control unit 124 returns to the state it was in after RESET, i.e., ready to load latch 126 with a new flit.

In the manner just described, flits propagate in parallel through FIFOs 46 and 48 until they reach the inputs to collector 50, as shown in FIG. 4. Top branch FIFO 46 indicates that it has a flit ready for collector 50 by bringing its full output signal, FULLTC 70, active high. Bottom branch FIFO 48 brings its full output signal, FULLBC, active high to signal that it has a flit ready to be loaded into collector 50. Collector 50 takes the two streams of flits and recreates the stream originally input to receiver 28. In other words, collector 50 collects the flits in the same order that they were distributed to FIFOs 46 and 48 even if they do not reach collector 50 in that order. Collector 50 recreates the original data stream input to receiver 28 by using collecting rules identical to the distribution rules of distributor 44. Collector 50 alternately loads flits from FIFOs 46 and 48 and begins collecting flits with the same FIFO to which distributor 44 distributed the first flit. As a result, collector 50 is able recreate the original flit stream even if flits propagate through one FIFO more quickly than the other.

Collector 50 also informs the appropriate FIFO 46 or 48 when it has loaded a flit from it, thereby enabling that FIFO to move the remaining flits downstream and possibly load another flit at the far upstream end. In other words, collector 50 generates the load input signals needed by the storage unit furthest downstream in both FIFOs 46 and 48. These signals are LDCT 74 and LDCB 76. The flit output by collector 50 is then coupled routing control circuitry for processing.

Figure 8A:
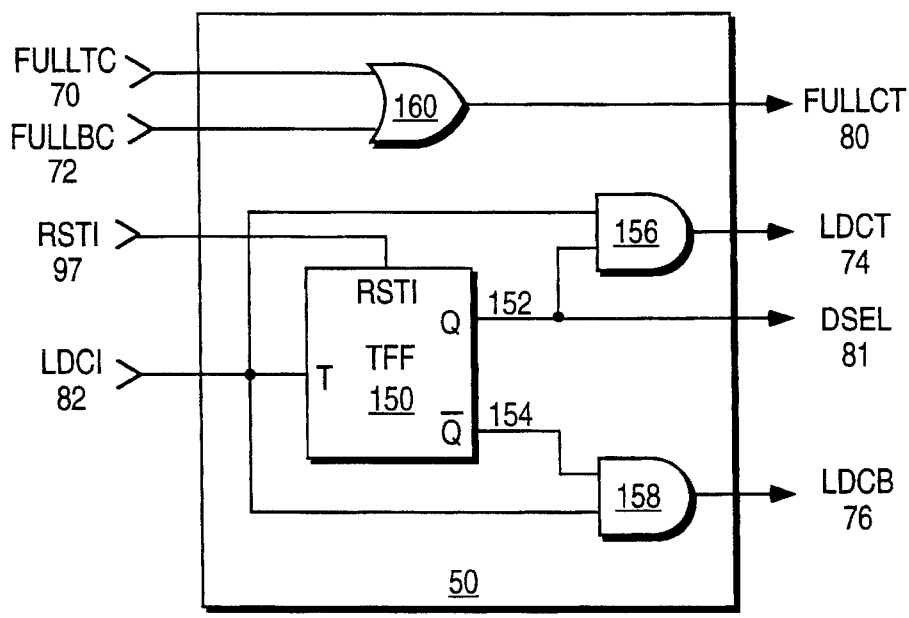
FIG. 8A is a schematic diagram of a collector.

FIG. 8A illustrates an embodiment of collector 50 schematically. Collector 50 includes toggle flip-flop 150, AND gates 156 and 158 and OR gate 160. Toggle flip-flop 150 is reset upon powering up of routing chip 22 by active low reset signal RSTI 97. Active RSTI 97 forces output 152 low and its complement, output 154, high. Upon reset the load input signal for collector 50, LDCI 82, is also forced inactive low. As a result, both LDCT 70 and LDCB 72 are both forced inactive low. Consequently, collector 50 cannot load flits from either FIFO 46 or 48 at this point. (Because control unit 124 expects a load input signal which is active low, the load signals generated by collector 50 will have to be inverted prior to coupling them to FIFOs 46 and 48.)

The first time LDCI 82 goes active high, LDCB 76 goes high informing bottom branch FIFO 48 that collector 50 has began loading its flit. When LDCI 82 returns low, LDCB 76 also goes low informing bottom branch FIFO 48 that its flit has been completely loaded. Also in response to LDCI 82 returning low, T-flip-flop 150 toggles state. T-flip-flop 150 also generates select signal DSEL 81, which is used to select which FIFO 46 or 48 sends data to routing circuitry 30. As a result, when LDCI 82 again goes high LDCT 74 goes high informing top branch FIFO 46 that its flit has began to be loaded, and the correct data is selected by multiplexer 51. Collector 50 thus alternately loads flit from top branch FIFO 46 and bottom branch FIFO 48.

Figure 8B:
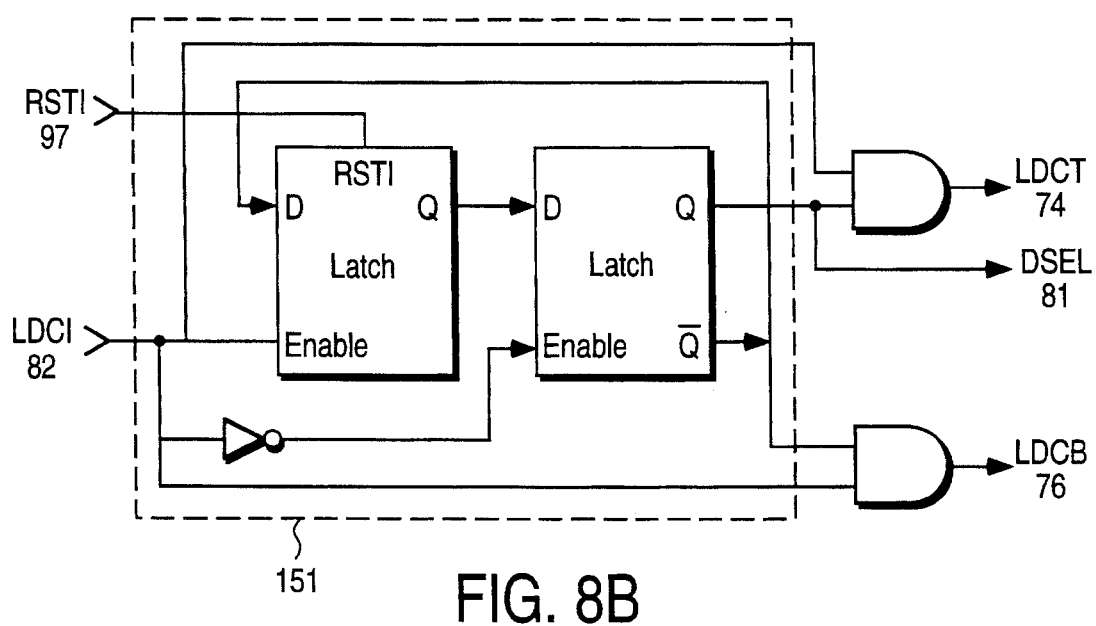
FIG. 8B is a schematic diagram of an alternate embodiment of the flip-flop of the collector.

In alternative embodiments of collector 50, T flip-flop 150 may be replaced with circuit 151 of FIG. 8B. Circuit 15 includes two latches and an inverter.

Collector 50 informs routing control circuitry 30 that it has a valid flit whenever either FIFO 46 or 48 stores a flit that is ready to be loaded. Collector 50 performs this function using OR gate 160, whose inputs are FULLTC 70 and FULLBC 72, the two full output signals generated by FIFOs 46 and 48.

In alternate embodiments of collector 50, OR gate 160 and AND gates 156 and 158 may be implemented using a combination of NAND gates and inverters.

Figure 9:
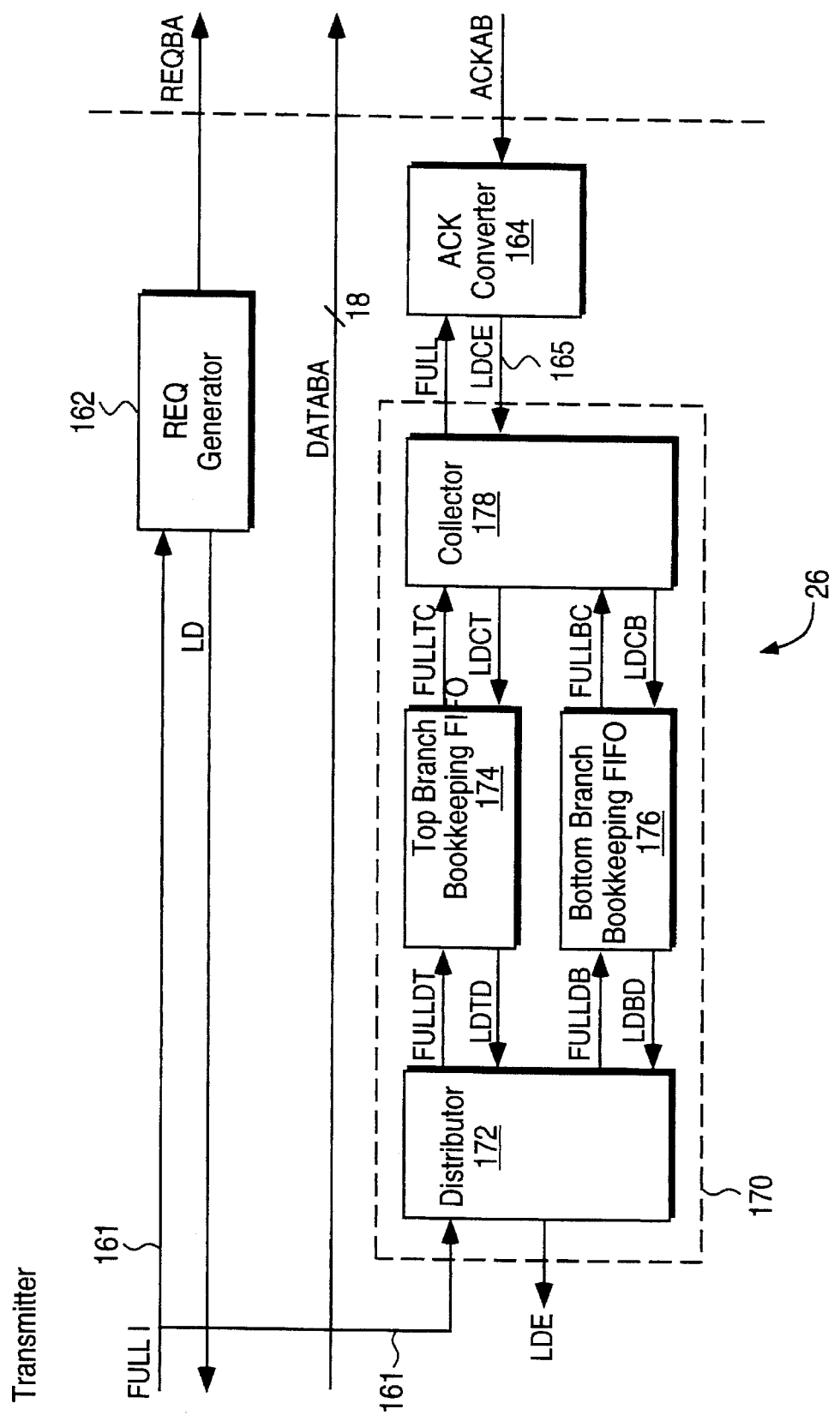
FIG. 9 is a block diagram of a self-timed, data streaming transmitter.

FIG. 9 illustrates in block diagram form transmitter 26. Transmitter 26 transmits flits from routing chip B 22 to routing chip A. Routing chip B22 accompanies each flit it transmits with a transmit request, signaled by REQBA. Converter 162 generates REQBA from a four cycle signal, FULLI 161, which is output by routing control circuitry 30. FULLI 161 is also coupled to bookkeeping circuitry 170 so that it may track the number of unacknowledged flits transmitted by transmitter 26. Note that proper operation of routing chip 22 requires that transmitter 26 send no more unacknowledged flits than the receiving routing chip is capable of data streaming. That is to say, the streaming depth of each transmitter cannot exceed the streaming depth of the receiver to which it is transmitting. The converse is not true.

Bookkeeping circuitry 170 operates much like the data streaming portion of receiver 28. Rather than streaming flits, bookkeeping circuitry 170 streams a single bit at time. Each bit streamed through bookkeeping circuitry 170 represents a flit transmitted by receiver 26 which has not been acknowledged. When the receiving routing chip, routing chip A, acknowledges receipt of a flit by toggling ACKAB, a bit is loaded from, or removed from, bookkeeping circuitry 170. This permits routing control circuitry 30 to transmit another flit, if it so desires.

Distributor 172 is realized using the distributor circuitry of FIG. 5. Thus, the discussion of FIG. 5 applies equally to distributor 172.

Bookkeeping circuitry 170 achieves increased streaming depth while reducing the latency time required to process incoming acknowledgments. Bookkeeping circuitry 170 does so using two FIFOs 174 and 176, which operate in parallel like those of receiver 28. As a result, the maximum number of unacknowledged transmit requests that can be transmitted and tracked is the sum of the streaming depths of FIFOs 174 and 176. Once both FIFOs are full, routing control circuitry 30 cannot transmit another flit until an ACKAB is received. Thus, transmitter 26 decreases the likelihood of interlock, or congestion, but does not prevent it.

The latency time of transmitter is the time required for the ACKAB stimulus to propagate through the FIFO 174 or 176 having the greatest storage capacity. As with receiver 28, the streaming depth of bookkeeping circuitry 170 can be increased by adding additional FIFOs in parallel with FIFOs 174 and 176.

Preferably FIFOs 174 and 176 have the same streaming depth, though transmitter 26 will operate well even if they do not. In one embodiment, both FIFOs have a streaming depth equal to that of FIFOs 46 and 48; i.e. equal to 8.

FIFOs 174 and 176 differ from FIFOs 46 and 48 in that they need not include D-latches 126. Because FIFOs 174 and 176 track one bit at a time, each bit representing an unacknowledged transmit request, FIFOs 174 and 176 can be constructed from a number of serially coupled, self-timing control units 124. The operation of control units 124 was described previously with respect to FIGS. 6 and 7.

Collector 178 distributes acknowledgments between FIFOs 174 and 176. Collector 178 does so whenever converter 164 asserts LDCE 165 in response to a change in the state of ACKAB. Collector 178 is realized using the collector circuitry discussed with respect to FIG. 8.

Figure 10A:
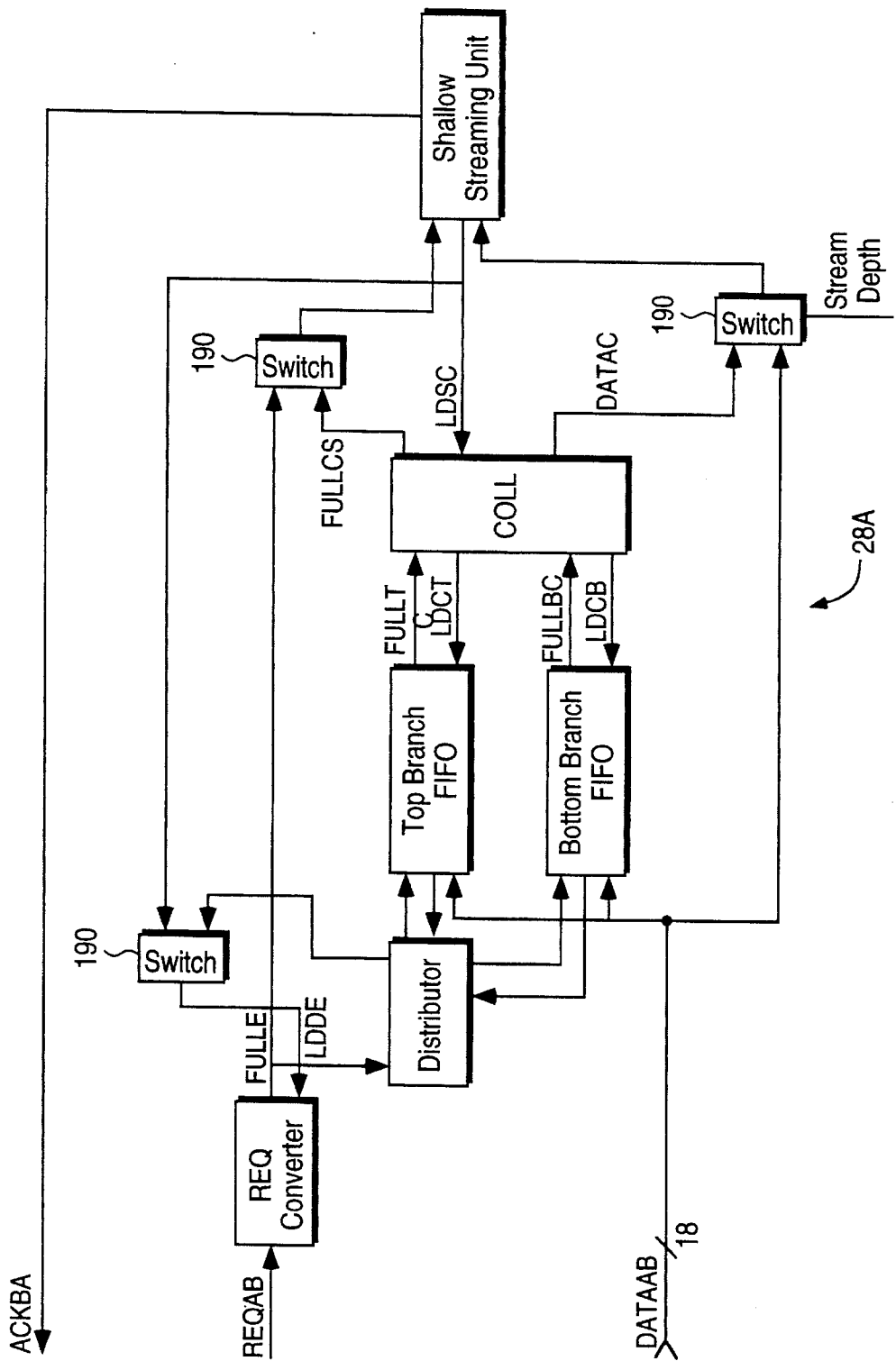
FIG. 10A is a block diagram of an alternate embodiment of a self-timed data streaming receiver.

FIG. 10A illustrates in block diagram form alternate embodiment 28a of receiver 28. Embodiment 28a provides backward compatibility with previous data streaming routing chips, which have a streaming depth of only 4 flits. Switches 190, when appropriately programmed, allow the routing chip user to enable the deepstreaming capabilities provided by the distributor, collector and the FIFOs operating in parallel in between them. The output of the collector is then coupled to the prior FIFO, which has less storage capacity than the other two FIFOs and is thus called the shallow streaming FIFO. Alternately, the routing chip user can program switches 190 to bypass the deep data streaming portion of the receiver and use only the shallow streaming unit.

Figure 10B:
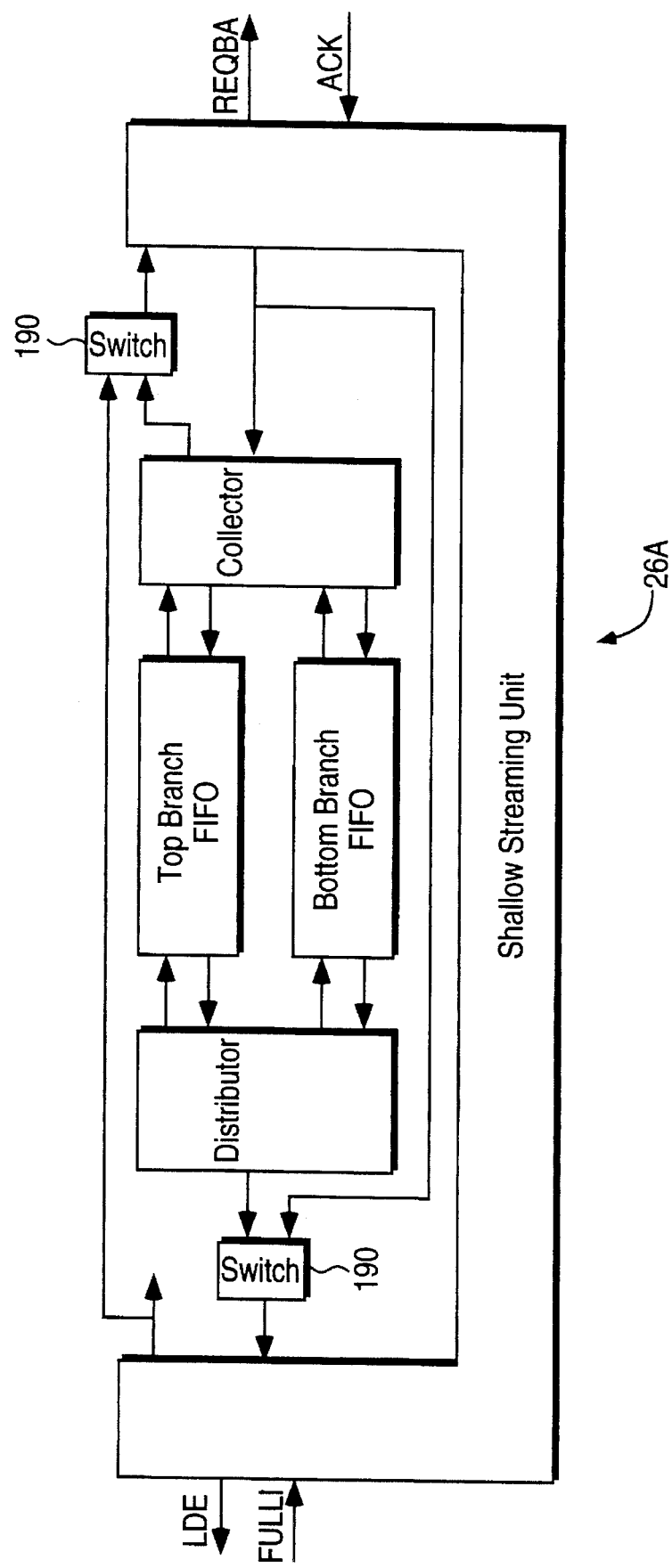
FIG. 10B is a block diagram of an alternate embodiment of a self-timed data streaming transmitter.

FIG. 10B illustrates an alternate embodiment 26a of transmitter 26. Note that the shallow streaming unit has been split in two and the deep streaming unit inserted in the gap. (A similar embodiment of receiver 28 is possible as well). The switches 190 allow a user to switch between deep and shallow streaming.

Thus, a self-timed receiver and a self-timed transmitter have been described that provide increased data streaming depth and reduced latency using multiple data streaming FIFOs operating in parallel.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A reduced latency, self-timed data streaming receiver in a first routing chip having a first microprocessor interface for receiving flow control units from a second routing chip having a second microprocessor interface, each flow control unit transmitted by the second routing chip being accompanied by a transmit request, the self-timed data streaming receiver generating an acknowledgment each time the self-timed data streaming receiver loads a flow control unit from the second routing chip, the first routing chip including routing circuitry for routing flow control units with reduced latency and increased data streaming, the routing circuitry being coupled to the self-timed data streaming receiver, the self-timed data streaming receiver comprising:

a. a first self-timed First-In First-Out (FIFO) register for buffering flow control units, the first FIFO buffer operating with reduced latency, without a master clock;

b. a second self-timed FIFO register for buffering flow control units, the second FIFO buffer operating with reduced latency, without a master clock;

c. a distributor for alternately distributing flow control units to the first self-timed FIFO register and the second self-timed FIFO register in response to a transmit request from the second routing chip; and d. a collector for collecting flow control units from the first self-timed FIFO register and the second self-timed FIFO and distributing flow control units in response to a load signal generated by the routing circuitry.

2. The self timed data streaming receiver of claim 1 wherein the transmit request is represented by an active state of a first transmit signal, the transmit signal also having an inactive state and wherein the distributor comprises:

a. a first toggle flip-flop having an input coupled to the first transmit signal, the first toggle flip-flop generating a first output signal and a second output signal, the first output signal and the second output signal being complementary;

b. a first NAND gate having a first input coupled to the first transmit signal and a second input coupled to the first output signal of the first toggle flip-flop, the first NAND gate generating a first full output signal, the first full output signal being coupled to the first FIFO register; and c. a second NAND gate having a first input coupled to the first transmit signal and a second input coupled to the second output signal of the first toggle flip-flop, the second NAND gate generating a second full output signal, the second full output signal being coupled to the second FIFO register.

3. The self-timed data streaming receiver of claim 2 wherein the first self-timed FIFO outputs a first FIFO load signal and the second self-timed FIFO outputs a second FIFO load signal and wherein the distributor further comprises:

d. an OR gate having inputs coupled to the first FIFO load signal and the second FIFO load signal, the OR gate outputting a distributor load signal having an active state and an inactive state, the active state of the distributor load signal indicating that the self-timed data streaming receiver can accept another flit from the second routing chip.

4. The self-timed data streaming receiver of claim 2 wherein the first self-timed FIFO outputs a first FIFO full signal and the second self-timed FIFO outputs a second FIFO full signal and wherein the collector comprises:

a. a first OR gate having inputs coupled to the first FIFO full signal and the second FIFO full signal, the first OR gate outputting to the routing circuitry a collector full signal having an active state and an inactive state, the active state indicating the collector stores a flow control unit.

5. The self-timed data streaming receiver of claim 4 wherein the acknowledgment is generated from a master load signal from the routing circuitry and wherein the collector further comprises;

b. a second toggle flip having an input coupled to the master load signal, the second toggle flip-flop generating a first output signal and a second output signal, the first output signal and the second output signal of the second toggle flip-flop being complementary to each other;

c. a first AND gate having a first input coupled to the first output signal of the second toggle flip-flop, the first AND gate having a second input coupled to the master load signal, the first AND gate outputting a first collector load signal, the first collector load signal being coupled to the first self-timed FIFO register; and d. a second AND gate having a first input coupled to the second output signal of the second toggle flip-flop, the second AND gate having a second input coupled to the master load signal, the second AND gate outputting a second collector load signal, the second collector load signal being coupled to the second self-timed FIFO register.

6. The self-timed data streaming receiver of claim 4 wherein the first self-timed FIFO and the second self-timed FIFO each comprise a multiplicity of serially coupled, self-timing latches.

7. The self-timed data streaming receiver of claim 6 wherein each self-timing latch comprises:

a. a D-type latch for storing a flow control unit applied to a latch input in response to a latch enable signal;

b. a control unit for generating the latch enable signal in response to a full input signal and a load input signal.

8. The self-timed data streaming receiver of claim 7 wherein the control unit generates a load output signal and full output signal.

9. The self-timed data streaming receiver of claim 8 wherein the control unit comprises:

a. a third NAND gate having a first input and a second input, the second being input coupled to the load output signal, the third NAND gate outputting the full output signal; and b. a fourth NAND gate having a first input coupled to the full output signal and a second input coupled to the load input signal, the fourth NAND gate having an output coupled to the first input of the third NAND gate.

10. The self-timed data streaming receiver of claim 9 wherein the control unit further comprises:

c. a fifth NAND gate having a first input coupled to the full input signal, a second input coupled to the load input signal, and third input coupled to the full output signal, the fifth NAND gate having an output;

d. a first inverter having an input coupled to the output of the fifth NAND gate, the first inverter outputting the latch enable signal; and e. a second inverter having an input coupled to the latch enable signal, the second inverter outputting the load output signal.

11. The self-timed data streaming receiver of claim 2 wherein the first self-timed FIFO and the second self-timed FIFO each comprise a multiplicity of serially coupled, self-timing latches.

12. The self-timed data streaming receiver of claim 11 wherein each self-timing latch comprises:

a. a D-type latch for storing a flow control unit applied to a latch input in response to a latch enable signal;

b. a control unit for generating the latch enable signal in response to a full input signal and a load input signal.

13. The self-timed data streaming receiver of claim 12 wherein the control unit generates a load output signal and full output signal.

14. The self-timed data streaming receiver of claim 13 wherein the control unit comprises:
   a. a third NAND gate having a first input and a second input, the second being input coupled to the load output signal, the third NAND gate outputting the full output signal; and
   b. a fourth NAND gate having a first input coupled to the full output signal and a second input coupled to the load input signal, the fourth NAND gate having an output coupled to the first input of the third NAND gate.

15. The self-timed data streaming receiver of claim 14 wherein the control unit further comprises:
   c. a fifth NAND gate having a first input coupled to the full input signal, a second input coupled to the load input signal, and third input coupled to the full output signal, the fifth NAND gate having an output;
   d. a first inverter having an input coupled to the output of the fifth NAND gate, the first inverter outputting the latch enable signal; and
   e. a second inverter having an input coupled to the latch enable signal, the second inverter outputting the load output signal.

16. The self-timed data streaming receiver of claim 1 wherein the first self-timed FIFO and the second self-timed FIFO each comprise a multiplicity of serially coupled, self-timing latches.

17. The self-timed data streaming receiver of claim 16 wherein each self-timing latch comprises:
   a. a D-type latch for storing a flow control unit applied to a latch input in response to a latch enable signal;
   b. a control unit for generating the latch enable signal in response to a full input signal and a load input signal.

18. The self-timed data streaming receiver of claim 17 wherein the control unit generates a load output signal and full output signal.

19. The self-timed data streaming receiver of claim 18 wherein the control unit comprises:
   a. a first NAND gate having a first input and a second input, the second being input coupled to the load output signal, the first NAND gate outputting the full output signal; and
   b. a second NAND gate having a first input coupled to the full output signal and a second input coupled to the load input signal, the second NAND gate having an output coupled to the first input of the first NAND gate.

20. The self-timed data streaming receiver of claim 19 wherein the control unit further comprises:
   c. a third NAND gate having a first input coupled to the full input signal, a second input coupled to the load input signal, and third input coupled to the full output signal, the third NAND gate having an output;
   d. a first inverter having an input coupled to the output of the third NAND gate, the first inverter outputting the latch enable signal; and
   e. a second inverter having an input coupled to the latch enable signal, the second inverter outputting the load output signal.

21. The self-timed data streaming receiver of claim 1 wherein the first self-timed FIFO outputs a first FIFO full signal and the second self-timed FIFO outputs a second FIFO full signal and wherein the collector comprises:
   a. a first OR gate having inputs coupled to the first FIFO full signal and the second FIFO full signal, the first OR gate outputting to the routing circuitry a collector full signal having an active state and an inactive state, the active state indicating the collector stores a flow control unit.

22. The self-timed data streaming receiver of claim 21 wherein the acknowledgment is generated from a master load signal from the routing circuitry and wherein the collector further comprises;
   b. a first toggle flip having an input coupled to the master load signal, the first toggle flip-flop generating a first output signal and a second output signal, the first output signal and the second output signal of the first toggle flip-flop being complementary to each other;
   c. a first AND gate having a first input coupled to the first output signal of the second toggle flip-flop, the first AND gate having a second input coupled to the master load signal, the first AND gate outputting a first collector load signal, the first collector load signal being coupled to the first self-timed FIFO register; and
   d. a second AND gate having a first input coupled to the second output signal of the first toggle flip-flop, the second AND gate having a second input coupled to the master load signal, the second AND gate outputting a second collector load signal, the second collector load signal being coupled to the second self-timed FIFO register.

23. The self-timed data streaming receiver of claim 22 wherein the first self-timed FIFO and the second self-timed FIFO each comprise a multiplicity of serially coupled, self-timing latches.

24. The self-timed data streaming receiver of claim 23 wherein each self-timing latch comprises:
   a. a D-type latch for storing a flow control unit applied to a latch input in response to a latch enable signal;
   b. a control unit for generating the latch enable signal in response to a full input signal and a load input signal.

25. The self-timed data streaming receiver of claim 24 wherein the control unit generates a load output signal and full output signal.

26. The self-timed data streaming receiver of claim 25 wherein the control unit comprises:
   a. a first NAND gate having a first input and a second input, the second being input coupled to the load output signal, the first NAND gate outputting the full output signal; and
   b. a second NAND gate having a first input coupled to the full output signal and a second input coupled to the load input signal, the second NAND gate having an output coupled to the first input of the first NAND gate.

27. The self-timed data streaming receiver of claim 26 wherein the control unit further comprises:
   c. a third NAND gate having a first input coupled to the full input signal, a second input coupled to the load input signal, and third input coupled to the full output signal, the third NAND gate having an output;
   d. a first inverter having an input coupled to the output of the third NAND gate, the first inverter outputting the latch enable signal; and
   e. a second inverter having an input coupled to the latch enable signal, the second inverter outputting the load output signal.

28. The self-timed data streaming receiver of claim 1 further comprising:
   e. a third self-timed FIFO register coupled between the collector and the routing circuitry.

29. The self-timed data streaming circuitry of claim 28 wherein the third FIFO register for storing flow control units comprises a second multiplicity of serially coupled, self-timing latches.

30. The circuitry of claim 29 wherein each self-timing latch comprises:
   a. a D-type latch for storing a flow control unit applied to its input in response to a load enable signal;
   b. a control unit for generating the load enable signal.

31. The self timed data streaming receiver of claim 28 wherein the transmit request is represented by an active state of a first transmit signal, the transmit signal also having an inactive state and wherein the distributor comprises:
   a. a first toggle flip-flop having an input coupled to the first transmit signal, the first toggle flip-flop generating a first output signal and a signal output signal, the first output signal and the second output signal being complementary;
   b. a first NAND gate having a first input coupled to the first transmit signal and a second input coupled to the first output signal of the first toggle flip-flop, the first NAND gate generating a first full output signal, the first full output signal being coupled to the first FIFO register; and
   c. a second NAND gate having a first input coupled to the first transmit signal and a second input coupled to the second output signal of the first toggle flip-flop, the second NAND gate generating a second full output signal, the second full output signal being coupled to the second FIFO register.

32. The self-timed data streaming receiver of claim 31 wherein the first self-timed FIFO outputs a first FIFO load signal and the second self-timed FIFO outputs a second FIFO load signal and wherein the distributor further comprises:
   d. an OR gate having inputs coupled to the first FIFO load signal and the second FIFO load signal, the OR gate outputting a distributor load signal having an active state, and an inactive state, the active state of the distributor load signal indicating that the self-timed data streaming receiver can accept another flow control unit from the second routing circuit.

33. The self-timed data streaming receiver of claim 31 wherein the first self-timed FIFO outputs a first FIFO full signal and the second self-timed FIFO outputs a second FIFO full signal and wherein the collector comprises:
   a. a first OR gate having inputs coupled to the first FIFO full signal and the second FIFO full signal, the first OR gate outputting to the routing circuitry a collector full signal having an active state and an inactive state, the active state indicating the collector stores a flow control unit.

34. The self-timed data streaming receiver of claim 33 wherein the acknowledgment is generated from a master load signal from the routing circuitry and wherein the collector further comprises;
   b. a second toggle flip having an input coupled to the master load signal, the second toggle flip-flop generating a first output signal and a second output signal, the first output signal and the second output signal of the second toggle flip-flop being complementary to each other;
   c. a first AND gate having a first input coupled to the first output signal of the second toggle flip-flop, the first AND gate having a second input coupled to the master load signal, the first AND gate outputting a first collector load signal, the first collector load signal being coupled to the first self-timed FIFO register; and
   d. a second AND gate having a first input coupled to the second output signal of the second toggle flip-flop, the second AND gate having a second input coupled to the master load signal, the second AND gate outputting a second collector load signal, the second collector load signal being coupled to the second self-timed FIFO register.

35. A reduced latency, self-timed data streaming transmitter in a first routing chip having a first microprocessor interface for transmitting flow control units to a second routing chip having a second microprocessor interface, each flow control unit transmitted by the first routing chip being accompanied a transmit request, the second routing chip sending an acknowledgment each time the second routing chip loads a flow control unit transmitted from the first routing chip, the first routing chip including a routing circuit coupled to the self-timed data streaming transmitter with reduced latency and increased data streaming, the self-timed data streaming transmitter comprising:
   a. a first self-timing First-In First-Out register (FIFO) for tracking a first number of unacknowledged requests to transmit a flow control unit, the first FIFO buffer operating with reduced latency, without a master clock;
   b. a second self-timing FIFO for tracking a second number of unacknowledged requests to transmit a flow control unit, the second FIFO buffer operating with reduced latency, without a master clock;
   c. a distributor coupled to the first self-timing FIFO and the second self-timing FIFO for distributing unacknowledged transmit-requests alternately to the first self-timing FIFO and the second self-timing FIFO, the distributor enabling the first routing chip to transmit another flow control unit to the second routing chip whenever the distributor receives a first load signal from the first self-timing FIFO or a second load signal from the second self-timing FIFO; and
   d. a collector for collecting acknowledgments from the second routing chip and alternately coupling them to the first self-timing FIFO and the second self-timing FIFO, receipt of an acknowledgment by one of the first and second self-timing FIFOs enabling the one to load another unacknowledged transmit request.

36. The self timed data streaming transmitter of claim 35 wherein each transmit request is represented by an active state of a first transmit signal from the routing circuitry, the transmit signal also having an inactive state and wherein the distributor comprises:
   a. a first toggle flip-flop having an input coupled to the first transmit signal, the first toggle flip-flop generating a first output signal and a signal output signal, the first output signal and the second output signal being complementary;
   b. a first NAND gate having a first input coupled to the first transmit signal and a second input coupled to the first output signal of the first toggle flip-flop, the first NAND gate generating a first full output signal, the first full output signal being coupled to the first self-timing FIFO register; and
   c. a second NAND gate having a first input coupled to the first transmit signal and a second input coupled to the second output signal of the first toggle flip-flop, the second NAND gate generating a second full output signal, the second full output signal being coupled to the second self-timing FIFO register.

37. The self-timed data streaming transmitter of claim 36 wherein the first self-timed FIFO outputs a first FIFO load signal and the second self-timed FIFO outputs a second FIFO load signal and wherein the distributor further comprises:

d. first OR gate having inputs coupled to the first FIFO load signal and the second FIFO load signal, the first OR gate outputting a distributor load signal having an active state, and an inactive state, the active state of the distributor load signal indicating that the self-timed data streaming transmitter can transmit another flow control unit to the second routing chip.

38. The self-timed data streaming transmitter of claim 37 wherein the first self-timed FIFO outputs a first FIFO full signal and the second self-timed FIFO outputs a second FIFO full signal and wherein the collector comprises:

a. a second OR gate having inputs coupled to the first FIFO full signal and the second FIFO full signal, the second OR gate outputting a collector full signal having an active state and an inactive state.

39. The self-timed data streaming receiver of claim 38 wherein an external load signal goes active in response to acknowledgments, and wherein the collector further comprises:

b. a second toggle flip having an input coupled to the external load signal, the second toggle flip-flop generating a first output signal and a second output signal, the first output signal and the second output signal of the second toggle flip-flop being complementary to each other;

c. a first AND gate having a first input coupled to the first output signal of the second toggle flip-flop, the first AND gate having a second input coupled to the external load signal, the first AND gate outputting a first collector load signal, the first collector load signal being coupled to the first self-timed FIFO register; and d. a second AND gate having a first input coupled to the second output signal of the second toggle flip-flop, the second AND gate having a second input coupled to the external load signal, the second AND gate outputting a second collector load signal, the second collector load signal being coupled to the second self-timed FIFO register.

40. The self-timed data streaming transmitter of claim 39 wherein the first self-timed FIFO and the second self-timed FIFO each comprise a multiplicity of serially coupled control units, each control unit having a full input, a load input, a full output and a load output.

* * * * *